US008868868B1

(12) United States Patent
Maheshwari et al.

(10) Patent No.: US 8,868,868 B1
(45) Date of Patent: Oct. 21, 2014

(54) METHOD AND SYSTEM FOR RESPONDING TO CLIENT REQUESTS FOR INFORMATION MAINTAINED BY STORAGE SYSTEMS (75) Inventors: Nilesh P. Maheshwari, Mountain View, CA (US); Sreenivasa Potakamuri, Sunnyvale, CA (US); Robert M. Armitano, Palo Alto, CA (US); Yinzen Hwang, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 324 days.

(21) Appl. No.: 13/485,740

(22) Filed: May 31, 2012

(51) Int. Cl.
*G06F 12/14* (2006.01)
*G06F 17/30* (2006.01)

(52) U.S. Cl.
USPC .............................................. 711/164; 726/6

(58) Field of Classification Search
None
See application file for complete search history.

(56) References Cited

U.S. PATENT DOCUMENTS

| 6,493,746 | B1 * | 12/2002 | Enjou ........................ 709/208 |
| 6,708,195 | B1 * | 3/2004 | Borman et al. ............... 718/102 |
| 8,086,585 | B1 * | 12/2011 | Brashers et al. .............. 707/705 |
| 2003/0233541 | A1 * | 12/2003 | Fowler et al. ................. 713/155 |

* cited by examiner

Primary Examiner — Gary Portka
(74) Attorney, Agent, or Firm — Klein, O'Neill & Singh, LLP (57) ABSTRACT

Method and system for providing information regarding a plurality of storage devices managed by a plurality of storage servers are provided. The storage space at the storage devices is presented to a plurality of computing systems as logical storage space. A plurality of searchable data structures having a plurality of data object types are stored at a temporary memory storage device of a management console that interfaces with the plurality of computing systems and the storage servers. Each data object type stores information regarding the storage device. The searchable data structure includes information regarding the storage devices and the logical storage space presented to the computing systems. A lock data structure for tracking locks that are assigned for accessing information pertaining to a storage server and a data object type is maintained to prevent unauthorized access to at least one of the searchable data structures.

20 Claims, 8 Drawing Sheets

| Lock Data Structure 128 |||
| --- | --- | --- |
| Storage System Identifier 128A | Data Object Type 128B | Lock # 128C |
| SSID1 | LUN | 1 |
| SSID1 | Volume | 2 |
| SSID1 | Aggregate | 3 |
| SSID1 | igroup | 4 |
| SSID1 | Storage Device | 5 |
| • | • | • |
| • | • | • |
| • | • | • |
| • | • | • |
| • | • | • |
| • | • | • |
| • | • | • |
| SSIDN | Storage Device | N |

METHOD AND SYSTEM FOR RESPONDING TO CLIENT REQUESTS FOR INFORMATION MAINTAINED BY STORAGE SYSTEMS

TECHNICAL FIELD

The present disclosure relates storage systems.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. From the perspective of a client computing system each storage volume can appear to be a single storage device. However, each storage volume can represent storage space in one storage device, an aggregate of some or all of the storage space in multiple storage devices.

As stored electronic data continues to increase, multiple storage servers may be used to interface with multiple client systems for reading and writing information. Often, a plurality of clients may request information regarding storage devices, storage volumes and their attributes. Continuous efforts are being made for efficiently processing multiple client requests that may request information regarding a plurality of storage devices managed by a plurality of storage servers.

SUMMARY

In one embodiment, a method and system for providing information regarding a plurality of storage devices managed by a plurality of storage servers are provided. The storage space at the storage devices may be presented to a plurality of computing systems as logical storage space. A plurality of searchable data structures having a plurality of data object types are stored at a temporary memory storage device of a management console that interfaces with the plurality of computing systems and the storage servers. Each data object type stores information regarding the storage device. The searchable data structure includes information regarding the storage devices and the logical storage space presented to the computing systems. A lock data structure for tracking locks that are assigned for accessing information pertaining to a storage server and a data object type is also maintained to prevent unauthorized access to at least one of the searchable data structures.

A request is received from one of the computing systems to access information regarding one of the storage devices managed by one of the storage servers. The request may identify a storage server that manages the storage device for which the information is sought. A search key using the storage server identification information is derived and the derived search key is used to obtain the requested information from the searchable data structure. A lock for the data structure storing the requested information is placed at the lock data structure to prevent unauthorized access while information is being provided to the computing system.

In another embodiment, a machine implemented method for providing information regarding a storage device to a computing system is provided. The method includes generating a plurality of searchable data structures for storing a plurality of data object types at a temporary memory storage device of a management console, where each data object type stores information regarding the storage device; maintaining a lock data structure to prevent access to at least one of the searchable data structures, where the lock data structure stores a plurality of locks, each lock associated with a storage server interfacing with the management console; and receiving a request from the computing system to access information regarding the storage device managed by a storage server, where the request is received by a processor executable management application executed by the management console and the request includes identification information of the storage server.

The method further includes deriving a key using the identification information of the storage server; using the derived key to obtain requested information from the searchable data structure; and placing a lock for the searchable data structure storing the requested information to prevent access while the information is being provided to the computing system.

In yet another embodiment, a machine implemented method for providing information regarding a storage device from among a plurality of storage devices to a computing system is provided. The method includes receiving a request at a management console from the computing system to access information regarding the storage device managed by a storage server from among a plurality of storage servers interfacing with the management console, where the request includes identification information of the storage server.

The method further includes generating a search key based on the identification information of the storage server and a data object identifier for one of data object types from among a plurality of data object types, where each data object type stores information regarding the plurality of storage devices; using the search key to obtain requested information from a searchable data structure maintained by the management console at a temporary memory cache and used for storing the plurality of data object types; and placing a lock for a portion of the searchable data structure storing the requested information to prevent access to the portion of the searchable data structure while the information is being provided to the computing system.

In another embodiment, a system having a plurality of client computing systems interfacing with a management console for receiving information related to a plurality of storage devices managed by a plurality of storage servers interfacing with the management console is provided. The management console is configured to generate a plurality searchable data structures for storing a plurality of data object types, where each data object type stores information regarding the plurality of storage devices; and maintains a lock data structure to prevent access to at least one of the searchable data structures. The lock data structure stores a plurality of locks, each lock associated with one of the storage servers interfacing with the management console.

The system also includes a processor executable key generator for generating a search key based on identification information of one of the plurality of storage servers and a unique identifier identifying a data object type. The management console uses the key to obtain any requested information from one of the searchable data structures and uses a lock to prevent access to the one of the searchable data structures while a request for providing the requested information is being processed.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one embodiment, a method and system for providing information regarding a plurality of storage devices managed by a plurality of storage servers are provided. The storage space at the storage devices may be presented to a plurality of computing systems as logical storage space. A plurality of searchable data structures having a plurality of data object types are stored at a temporary memory storage device of a management console that interfaces with the plurality of computing systems and the storage servers. Each data object type stores information regarding the storage device. The searchable data structure includes information regarding the storage devices and the logical storage space presented to the computing systems. A lock data structure for tracking locks that are assigned for accessing information pertaining to a storage server and a data object type is also maintained to prevent unauthorized access to at least one of the searchable data structures.

A request is received from one of the computing systems to access information regarding one of the storage devices managed by one of the storage servers. The request may identify a storage server that manages the storage device for which the information is sought. A search key using the storage server identification information is derived and the derived search key is used to obtain the requested information from the searchable data structure. A lock for the data structure storing the requested information is placed at the lock data structure to prevent unauthorized access while information is being provided to the computing system.

Figure 1A:
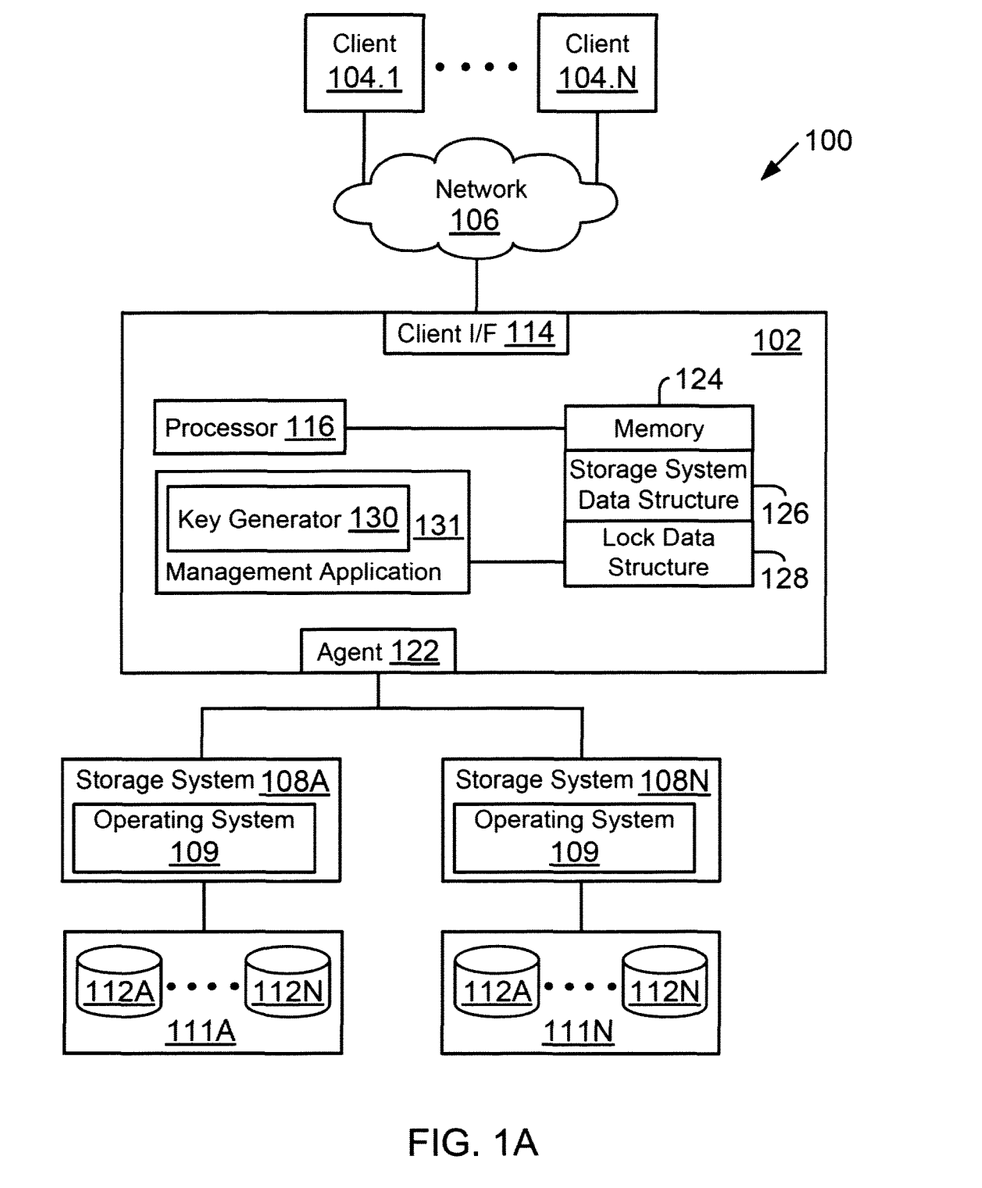
FIG. 1A shows an example of a storage environment using a plurality of storage systems, according to one embodiment.

Storage Environment 100:

FIG. 1A depicts a storage environment 100 having a plurality of storage devices and storage systems, used according to one embodiment. Storage environment 100 may include a plurality of client computing systems 104.1-104.N (may also be referred to as client 104) interfacing with a plurality of storage systems (may also be referred to as storage servers) 108A-108N (may be individually referred to as storage system 108) via a management console 102 and at least one network 106 that may be a local area network (LAN), wide area network (WAN), the Internet or any other connection type.

Management console 102 may include a client interface 114 to communicate with client systems 104.1-104.N. Client interface 114 includes logic/circuitry for receiving and parsing client requests and forwarding the client requests to an appropriate module of management console 102. Client interface 114 may also be used to send information to clients in response to client requests or otherwise.

Management console 102 may also execute an agent 122 for communicating with storage systems 108A-108N. As an example, agent 122 may be a SMIS (Storage Management Initiative Specification) agent based on the SMIS standard provided by the Storage Network Industry Association (SNIA). SMIS is intended to facilitate management commands between a management console and storage servers. Agent 122 includes instructions and logic for sending information to storage systems 108A-108N and receiving information from the storage systems. It is noteworthy that the embodiments disclosed herein are not limited to any specific format/structure of agent 122.

Management console 102 also includes a processor 116 and a memory 124. Processor 116 may include one or more programmable general-purpose or special-purpose microprocessors, digital signal processors (DSPs), programmable controllers, application specific integrated circuits (ASICs), programmable logic devices (PLDs), or the like, or a combination of such hardware devices. Processor 116 executes a management application 131 out of memory 124 or another memory location (not shown).

Management application 131 may be used to store information regarding the storage devices and storage systems 108A-108N at memory 124 to process multiple client requests for information regarding the storage devices. Memory 124 may be used as a temporary cache for storing a plurality of data structures, for example a storage system data structure 126 and a lock data structure 128 that are described below in detail. The data structures may store information regarding storage system 108, storage devices 112 and other information.

In one embodiment, a key generator 130 is provided to generate a key for populating different fields of storage system data structure 126, as described below in detail. Key generator 130 may be a part of management application 131 or operate as an independent module.

In conventional systems, processor 116 may use a linked list for storing different information types. The linked list is a data structure having a group of nodes which together represent a sequence. Each node includes a datum and a link to the next node. Conventional systems use linked lists because list elements can easily be inserted or removed without reallocation or reorganization of the entire structure because the data items need not be stored contiguously in memory. Linked lists allow insertion and removal of nodes at any point in the list, and can do so with a constant number of operations if the link previous to the link being added or removed is maintained during list traversal.

One major challenge of using linked lists is that they do not allow random access to data, or any form of efficient indexing. Thus, many basic operations such as obtaining a last node of the list (assuming that the last node is not maintained as separate node reference in the list structure), or finding a node that contains a given datum, or locating a place where a new node should be inserted may require scanning most or all of the list elements.

As an example, in conventional systems, storage volumes and logical unit numbers (LUNs) (described below) may be represented as nodes of a linked list for storing information regarding the storage volumes and the LUNs. The storage volume nodes may link to the LUN nodes. If information is needed for a particular storage volume or LUN then the entire linked list has to be traversed to obtain the information.

Furthermore, when a request is received to obtain information, a lock is assigned to the linked list so that the linked list cannot be accessed until a response to the request can be prepared. The lock is assigned to avoid conflict to access the same information. Other pending requests have to wait till the lock is cleared to access information stored by the linked list. This can cause performance degradation and congestion when multiple requests from multiple clients are received at the same time to access information regarding storage devices managed by multiple storage systems.

The embodiments disclosed herein use storage system data structure 126 and the lock data structure 128 instead of a linked list. Details regarding the various data structures and how they are generated and used are provided below in detail.

Referring back to FIG. 1A, clients 104.1-104.N as described below in more detail may be general purpose computers having a plurality of components. These components may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 104 use storage systems 108A-108N to read and write information. Each storage system 108A-108N may include or have access to a storage subsystem 111 (shown as 111A-111N) having multiple mass storage devices 112A-112N (may also be referred to as storage devices 112). The mass storage devices 112 may be, for example, conventional magnetic disks, optical disks such as CD-ROM or DVD based storage, magneto-optical (MO) storage, flash based storage devices or any other type of non-volatile storage devices suitable for storing structured or unstructured data.

The storage system 108 executes a storage operating system 109 for managing storage space within storage subsystem 111 and presenting storage space to clients 104. As an example, storage operating system 109 maybe the DATA ONTAP® storage operating system, available from NetApp®, Inc., that implements a Write Anywhere File Layout (WAFL®) storage system, or any other suitable storage operating system.

Storage operating system 109 and applications running on the client systems 104.1-104.N communicate according to well-known protocols, such as the NFS (Network File System) protocol or the CIFS (Common Internet File System) protocol, to make data stored on storage device 112 appear to users and/or application programs as though the data were stored locally on the client systems 104.1-104.N.

Storage operating system 109 presents or exports data stored at storage devices 112 as a storage volume (may also be referred to as a volume) to client systems 104.1-104.N. In one embodiment, a storage volume is a logical data set which is an abstraction of physical storage, combining one or more physical mass storage devices or parts thereof into a single logical storage object. Each storage volume is identified by a unique identifier by the storage system that presents the storage volume.

A storage volume may be configured to store data containers, scripts, word processing documents, executable programs and any other type of structured or unstructured data. The term data container as used herein means a block, a file, a logical unit of data or any other information. Each storage volume can represent storage space in one storage device, an aggregate of some or all of the storage space in multiple storage devices, a RAID (redundant array of inexpensive disks) group, or any other suitable set of storage space. An aggregate of storage space is identified by a unique identifier by the storage system that manages the aggregate.

The storage systems present one or more LUNs to clients for storing information. Each LUN is uniquely identified by the storage system that presents the LUN. Each LUN identifies a specific logical unit, which may be a part of a storage device, an entire storage device or several storage devices. Each LUN is associated with the storage volume that is presented to the client systems.

In a typical mode of operation, one of the client systems transmit one or more I/O (input/output) commands, such as an NFS or CIFS request, over network 106 to the storage system 108. The storage system 108 issues one or more I/O commands to storage device 112 to read or write the data on behalf of the client system. The storage system 108 also issues an NFS or CIFS response containing the requested data over network 106 to the client system.

Figure 1B:
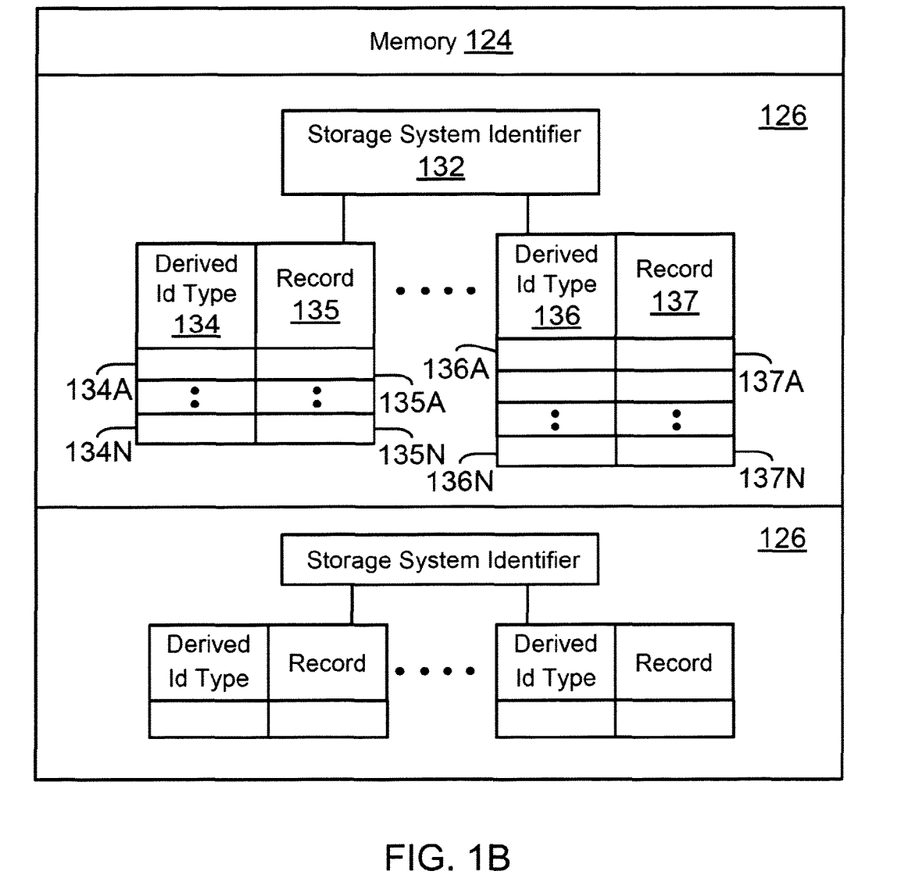
FIG. 1B shows a searchable storage system data structure, according to one embodiment.

FIG. 1B shows an example of storage system data structure 126 (may also be referred to as data structure 126) maintained at memory 124 by management console 124 responding to client requests, according to one embodiment. It is noteworthy that storage system data structure 126 may be stored as an integrated searchable structure or as a plurality of searchable data structures. In one embodiment, storage system data structure 126 stores a storage system identifier 132 that is used to uniquely identify a storage system, for example, 108A.

Figure 1C:
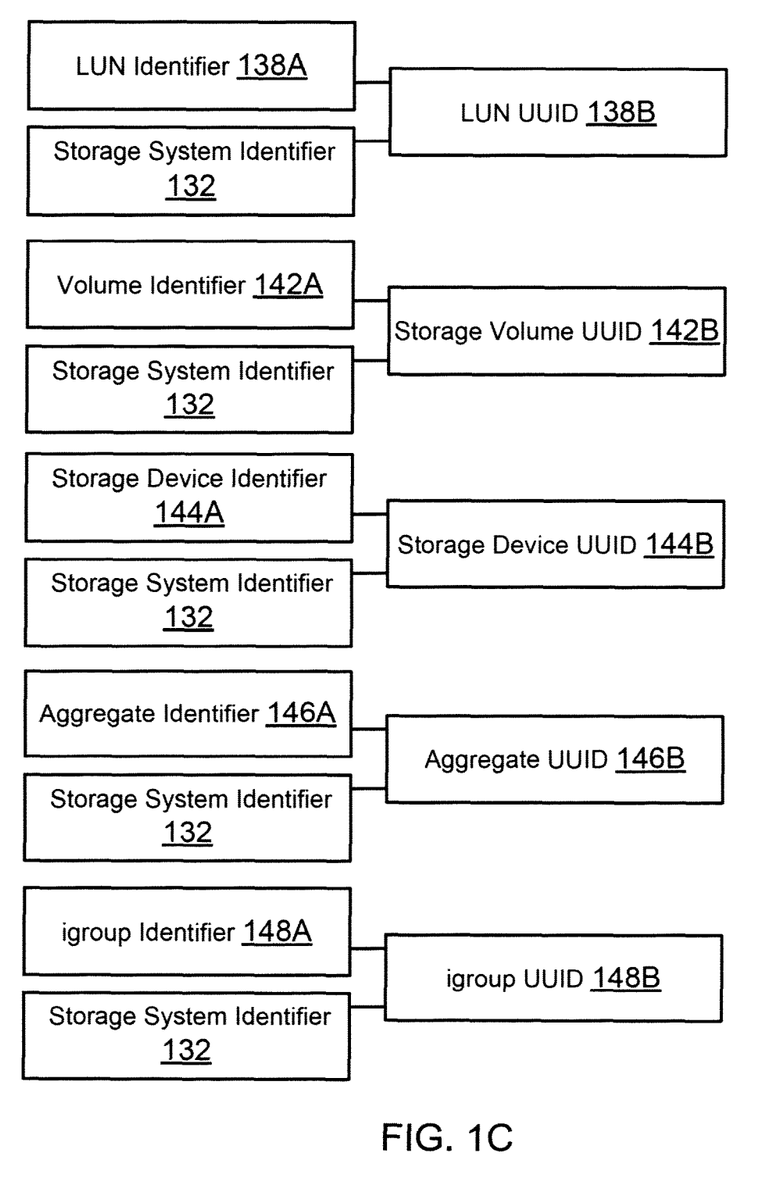
FIG. 1C shows an example of the searchable storage system data structure of FIG. 1B.

Data structure 126 stores a plurality of derived identifier types 134 and 136 that are associated with data objects for a storage system identified by the storage system identifier 132. Each identifier type stores derived identifiers, for example, 134A-134N and 136A-136N for a data object type. Records corresponding for each identifier type are stored as part of the data structure 126, shown as 135A-135N for identifier type 134 and 137A-137N for identifier type 136, respectively. Examples different data object types and identifiers are shown in FIG. 10 and described below in detail.

One data object type may be used for storing information regarding different LUNs that are presented to client systems 104.1-104.N by storage systems 108A-108N. Referring to FIG. 10, each LUN is typically identified by a LUN identifier 138A that may be assigned when a LUN is configured. Details of LUN configuration are not germane to the embodiments disclosed herein.

The key generator 130 uses the LUN identifier 138A and the storage system identifier 132 that identifies storage system 108A to generate a universal unique identifier (UUID) for each LUN managed by storage system 108A. The LUN UUID 138B may be stored under segment 134 (or 136 of FIG. 1B) and details regarding the LUN, for example, LUN name, LUN size, LUN state (i.e. online or offline), drive letter, LUN path, block size used for the LUN, total space used by the LUN and total space available, permissions to access the LUN or any other LUN related information may be stored as records under segment 135 (or 137). Different UUIDs are used for different LUNs and records for each LUN are stored corresponding to the derived UUIDs.

Another example of a data object type is a volume data object that may be used for storing storage volume information. Each storage volume is typically identified by a volume identifier 142A that may be generated by storage system 108A during volume configuration. Details of volume configuration are not germane to the embodiments disclosed herein. The key generator 130 derives a storage volume UUID 142B using the volume identifier 142A and the storage system identifier 132. The UUID 142B may be stored under segment 134 (or 136 of FIG. 1B). Details regarding each storage volume, for example, volume name, state of the volume (i.e. offline or online), size of the volume, total storage space allocated to the volume, total storage space used, total space available, aggregate to which the volume is a part of, or any other volume information may be stored as part of a record corresponding to each storage volume UUID. The record for each UUID may be stored under segment 135 (or 137).

Yet another example of a data object type is a storage device data object used for storing information regarding storage devices 112. A storage device identifier 144A and the storage system identifier 132 are used to generate a storage device UUID 144B. The storage device UUID 144B may be stored under segment 134 (or 136) and details regarding the storage device, for example, size of the storage device, storage device partition information or any other information may be stored as part of a record stored under segment 135 (or 137). Different UUIDs may be used for different storage devices and records for each storage device are stored corresponding to the derived UUIDs.

Yet another example of a data object type is an aggregate data object used for storing information regarding aggregates. An aggregate identifier 146A and the storage system identifier 132 are used to generate an aggregate UUID 146B for each aggregate. The aggregate UUID 146B may be stored under segment 134 (or 136) and details regarding the aggregates, for example, aggregate name, total aggregate size, aggregate configuration (i.e. RAID type), aggregate partition information, permission information for accessing an aggregate, aggregate state (i.e. online or offline), aggregate size that is used and available or any other aggregate information may be stored as part of a record stored under segment 135 (or 137). Different UUIDs may be used for different aggregates and records for each aggregate are stored corresponding to the derived UUIDs.

Yet another example of a data object type is an initiator group (igroup) data object used for storing information regarding igroups. An igroup identifies one or more initiators (or host computing systems identified by their host bus adapters) that are authorized to access a particular LUN. Each igroup is identified by an igroup identifier 148A. The igroup identifier 148A and the storage system identifier 132 are used to generate an igroup UUID 148B that may be stored under segment 134 (or 136). Details regarding each igroup, for example, igroup name, operating system used by the igroup, igroup type i.e. iSCSI or FOP initiator, worldwide port number (WWPN) for the igroup, or any other igroup information may be stored as part of a record stored under segment 135 (or 137). Different UUIDs may be used for different igroups and records for each igroup are stored corresponding to the derived UUIDs.

Figure 1D:
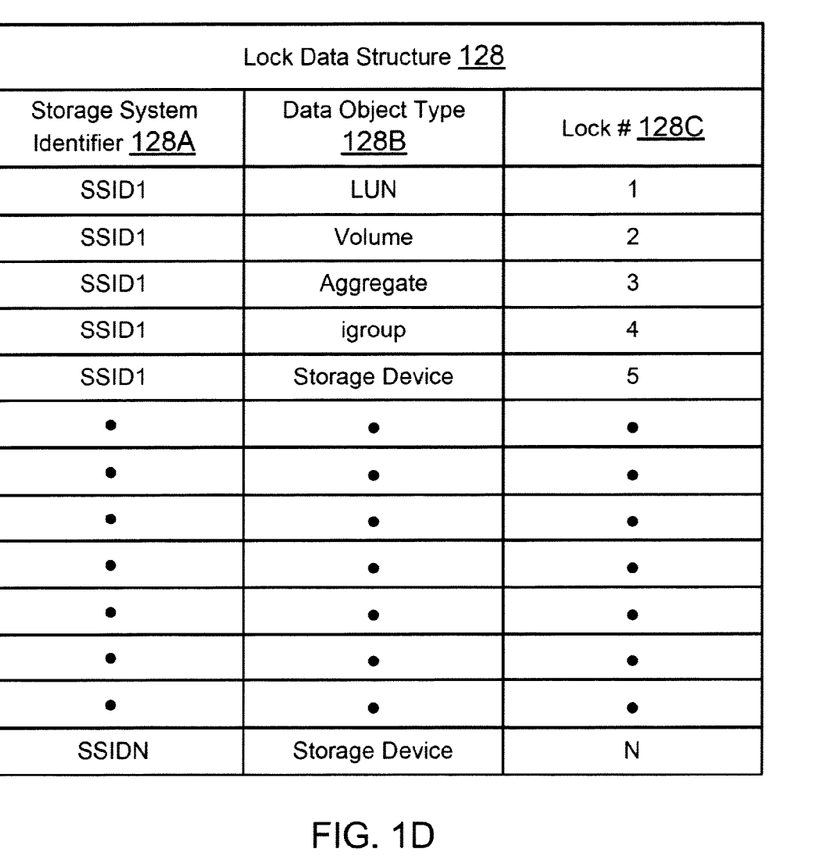
FIG. 1D shows an example of a lock data structure, according to one embodiment.

FIG. 1D shows an example of the lock data structure 128 that is maintained by management console 102, according to one embodiment. The lock data structure 128 includes a segment 128A for identifying one of storage systems 108A-108N (for example, SSD1-SSDN). Segment 128B identifies a data object UUID for whom a lock is assigned. The assigned lock for each data object is shown in segment 128C. Details regarding generating the lock data structure 128 and using the data structure is provided below.

Figure 1E:
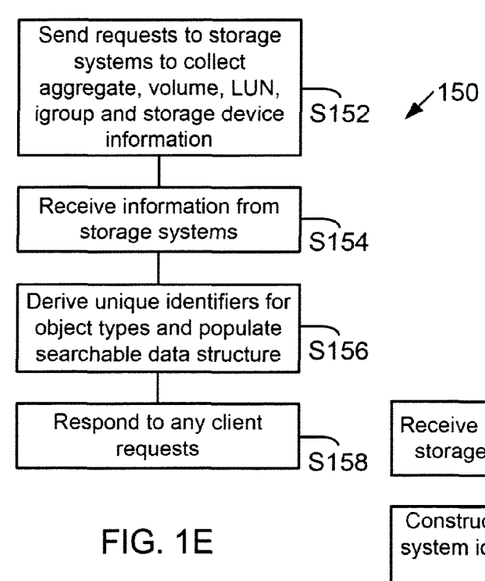
FIGS. 1E and 1F show process flow diagrams, according to one embodiment.

FIG. 1E shows a process 150 for generating storage system data structure 126, according to one embodiment. The process begins in block S152, when management console 102 sends a request to storage system 108 to collect aggregate, volume, LUN, storage device, igroup or any other information that can be stored as records 135/137 described above with respect to FIGS. 1B and 1C. Storage systems 108A-108N maintain the information since they manage the various storage devices and also present LUNs and storage volumes to the client systems.

The request for information may be included within a discovery packet that may be sent by management console 102 for discovering information regarding various system 100 components. The format of the discovery packet may be based on a protocol, for example, Fibre Channel, used by the management console 102 to communicate with the storage systems. The embodiments disclosed herein are not limited to any particular format/protocol.

In block S154, the requested information is received from the storage systems 108A-108N. In block S156, UUID for different data object types is generated (or derived) by key generator 130. Examples of different data object type are shown in FIG. 10 and described above. The records and derived UUIDs are then used to populate data structure 126 and thereafter, and in block S158, management console 102 is ready to respond to client requests, as described below with respect to FIG. 1F.

Figure 1F:
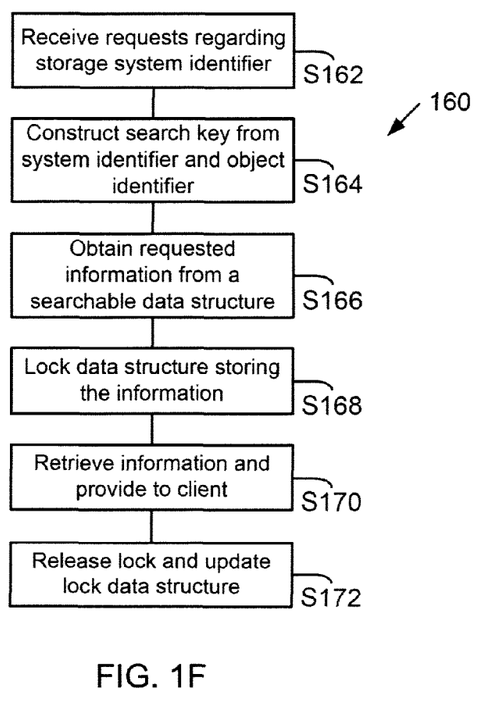

FIG. 1F shows a process 160 for providing information to clients, according to one embodiment. The process begins when in block S162, one or more requests for storage system information is received. The request may be to obtain information regarding a LUN, aggregate, storage volume, storage device and/or igroup.

In block S164, the key generator 130 constructs (generates or derives) a data object UUID (or key) from a storage system identifier (for example, 132) and a data object identifier, such as, LUN identifier 138A, volume identifier 142A, storage device identifier 144A, aggregate identifier 146A or igroup identifier 148A. In one embodiment, the client computing system may provide the storage system identifier and the data object identifier. After which the key generator 130 generates the key.

In another embodiment, the client system may only provide the storage system identifier and a data object type (i.e. LUN, storage volume, aggregate or others). The key generator 130 may obtain the data object identifier from management application 131 because management application 131 maintains a data structure (not shown) that identifies what LUNs, storage volumes, aggregate or others have been assigned to a particular client for a storage system. Using the storage system identifier and the data object identifier, the key generator 130 generates the key.

In block S168, the generated key is used to index into data structure 126. The requested information corresponding to the constructed key is obtained and the data structure is locked by processor 116. The requested information is then provided to the client system in block S170 and the lock associated with the lock data structure is released in block S172. Thereafter, the lock data structure 128 is updated so that portion of the data structure 126 accessed in block S168 can be accessed again for a next request.

The foregoing processes and data structures have advantages over the conventional linked list approach. Instead of using a single lock for an entire cache that stores a linked list, multiple locks are used in the foregoing processes. For example, a separate lock may be used for each storage system. When a client request is for information regarding a storage device managed by storage system 108A, then a lock is only placed to that portion of the data structure that stores the information pertaining to storage system 108A. The management console 102 can continue to respond to requests that are related to other storage systems.

In another embodiment, individual locks are associated with the storage system and for each data object type. For example, a lock may be used for each storage system and LUN UUIDs. When a request for a LUN is received, then the lock only prevents access to LUN information for a specific storage system. Requests involving storage volumes, aggregates, storage devices and other information for the same storage system may be processed at the same time while LUN information is provided for the same storage system.

Figure 2:
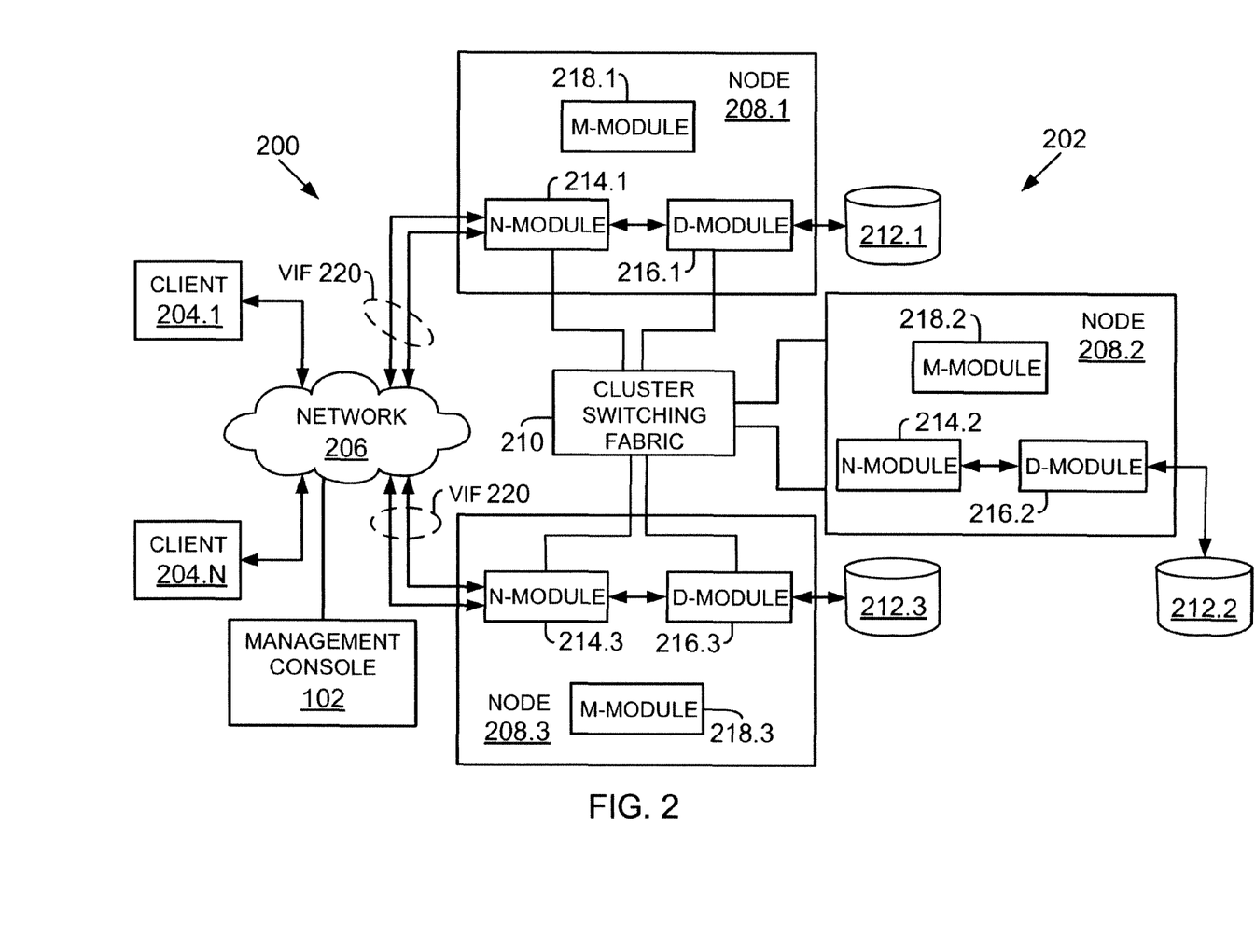
FIG. 2 shows an example of a clustered storage environment used according to one embodiment.

Clustered System:

FIG. 2 shows a cluster based storage environment 200 having a plurality of nodes for managing storage devices, according to one embodiment. In the clustered environment, information regarding data structure 126 is maintained by the various nodes. Management console 102 obtains information regarding the different data objects from the various nodes. The process flow of FIGS. 1E and 1F are applicable to storage environment 200.

Storage environment 200 may include a plurality of client systems 204.1-204.N (similar to 104.1-104.N), a clustered storage system 202, management console 102 and at least a network 206 communicably connecting the client systems 204.1-204.N and the clustered storage system 202. As shown in FIG. 2, the clustered storage system 202 includes a plurality of nodes 208.1-208.3, a cluster switching fabric 210, and a plurality of mass storage devices 212.1-212.3 (may be referred to as 212 and similar to storage device 112).

Each of the plurality of nodes 208.1-208.3 is configured to include an N-module, a D-module, and an M-Module, each of which can be implemented as a processor executable module. Specifically, node 208.1 includes an N-module 214.1, a D-module 216.1, and an M-Module 218.1, node 208.2 includes an N-module 214.2, a D-module 216.2, and an M-Module 218.2, and node 208.3 includes an N-module 214.3, a D-module 216.3, and an M-Module 218.3.

The N-modules 214.1-214.3 include functionality that enable the respective nodes 208.1-208.3 to connect to one or more of the client systems 204.1-204.N over the computer network 206, while the D-modules 216.1-216.3 connect to one or more of the storage devices 212.1-212.3. Accordingly, each of the plurality of nodes 208.1-208.3 in the clustered storage server arrangement provides the functionality of a storage server.

The M-Modules 218.1-218.3 provide management functions for the clustered storage system 202. The M-Modules 218.1-218.3 collect storage information regarding storage devices 212 and makes it available to clients and/or storage operating systems.

A switched virtualization layer including a plurality of virtual interfaces (VIFs) 220 is provided to interface between the respective N-modules 214.1-214.3 and the client systems 204.1-204.N, allowing storage 212.1-212.3 associated with the nodes 208.1-208.3 to be presented to the client systems 204.1-204.N as a single shared storage pool.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2 depicts an equal number (i.e., 3) of the N-modules 214.1-214.3, the D-modules 216.1-216.3, and the M-Modules 218.1-218.3, any other suitable number of N-modules, D-modules, and M-Modules may be provided. There may also be different numbers of N-modules, D-modules, and/or M-Modules within the clustered storage system 202. For example, in alternative embodiments, the clustered storage system 202 may include a plurality of N-modules and a plurality of D-modules interconnected in a configuration that does not reflect a one-to-one correspondence between the N-modules and D-modules.

The client systems 204.1-204.N of FIG. 2 may be implemented as general-purpose computers configured interact with the respective nodes 208.1-208.3 in accordance with a client/server model of information delivery. In the presently disclosed embodiment, the interaction between the client systems 204.1-204.N and the nodes 208.1-208.3 enable the provision of network data storage services.

Specifically, each client system 204.1, 204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.N may issue packets according to file-based access protocols, such as the NFS or CIFS protocol, when accessing information in the form of files and directories.

Figure 3:
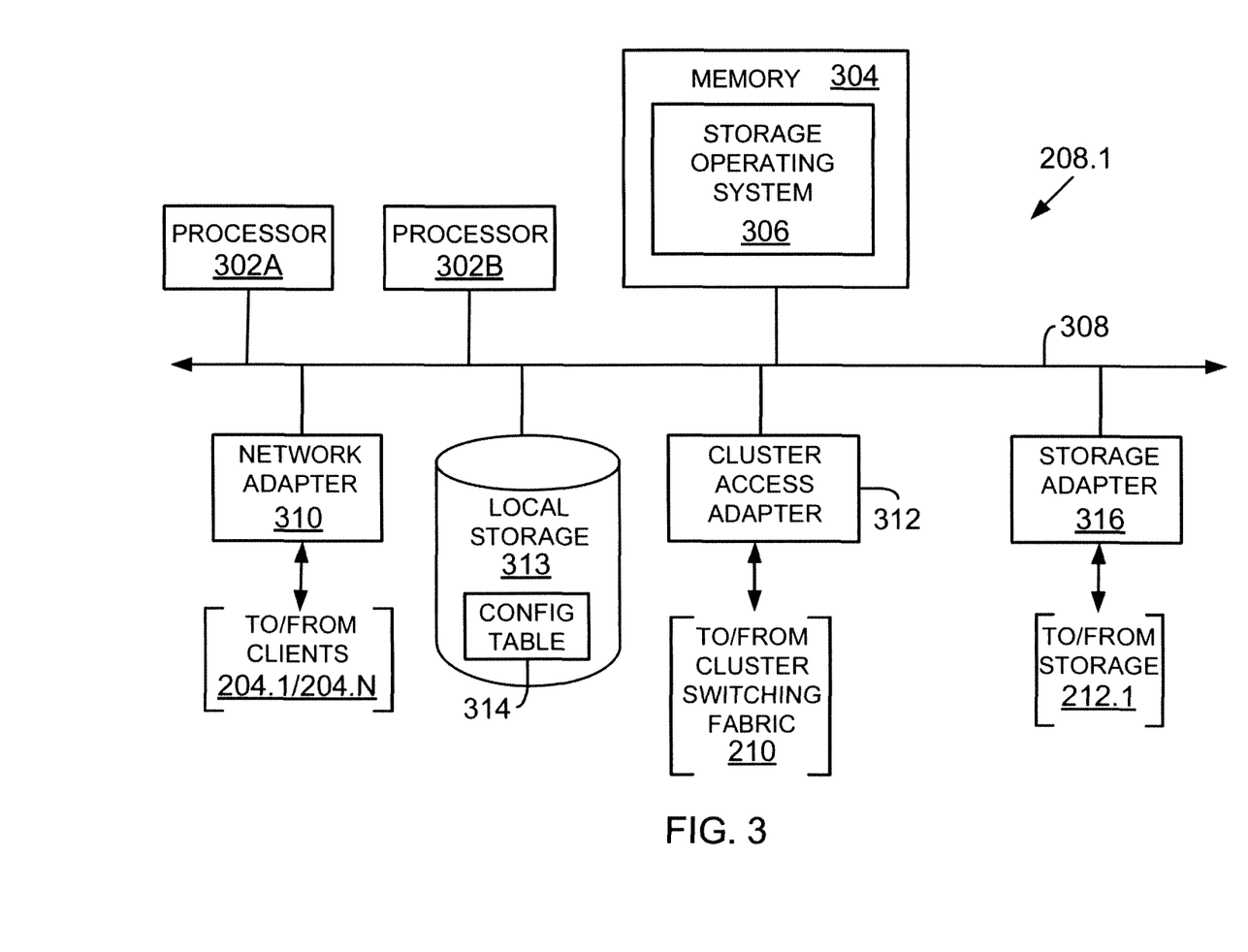
FIG. 3 shows an example of a node used in a cluster based storage system, according to one embodiment.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to provide information regarding various data object types to management console 102 for populating data structure 126.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314. The configuration information may include the information that is stored in data structure 126 described above in detail.

The cluster access adapter 312 comprises a plurality of ports adapted to couple node 208.1 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 312 is utilized by the N/D-module for communicating with other N/D-modules in the cluster 100.

Each node 208.1 is illustratively embodied as a dual processor storage system executing a storage operating system 306 (similar to 109, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the N-module 104 on the node, while the other processor 302B executes the functions of the D-module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
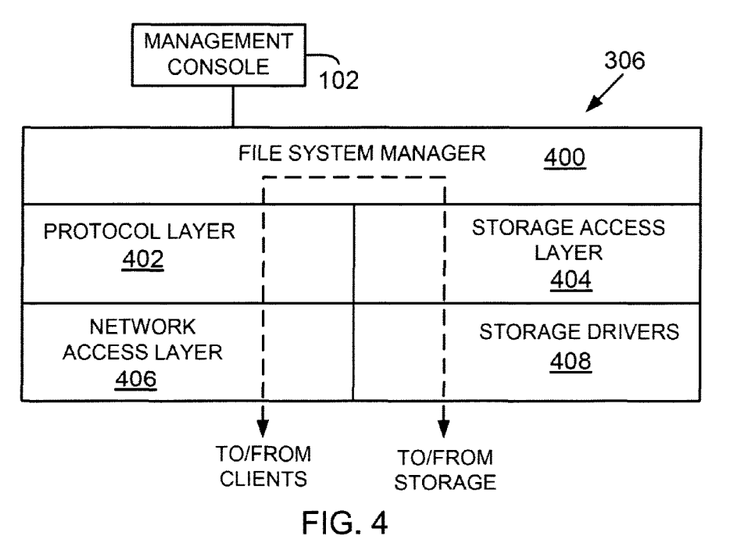
FIG. 4 shows an example of a storage operating system, used according to one embodiment.

Operating System:

FIG. 4 illustrates a generic example of storage operating system 306 (or 109, FIG. 1A) executed by node 208.1, according to one embodiment of the present disclosure. The storage operating system 306 maintains information regarding various storage devices, storage volumes, LUNs, aggregates and the igroups. The information is provided to management console 102, as described above in detail with respect to FIG. 1E.

In one example, storage operating system 306 may include several modules, or "layers" executed by one or both of N-Module 214 and D-Module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others, as described below.

Network access layer 406 may include one or more drivers, which implement one or more lower-level protocols to communicate over the network, such as Ethernet. Interactions between clients' 204.1/204.N and mass storage devices 212.1 are illustrated schematically as a path, which illustrates the flow of data through storage operating system 306. Network access layer 406 may maintain a data structure for storing igroup information that is provided to management console 102 for data structure 126.

The storage operating system 306 may also include a storage access layer 404 and an associated storage driver layer 408 to allow D-module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information LUN, storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP0, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

Figure 5:
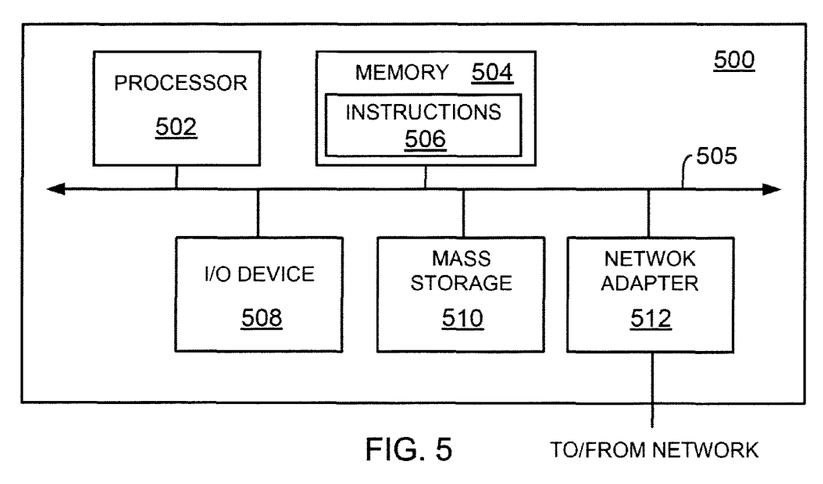
FIG. 5 shows an example of a computing system, used according to one embodiment.

Processing System:

FIG. 5 is a high-level block diagram showing an example of the architecture of a processing system 500 that may be used according to one embodiment. The processing system 500 can represent management console 102, client 104 or storage system 108. Note that certain standard and well-known components which are not germane to the present invention are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain embodiments, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 implement the process steps described above with respect to FIGS. 1E and 1F may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system, 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Cloud Computing:

The techniques described above are applicable in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer is a cloud platform and cloud infrastructure followed by a "server" layer that includes hardware and computer software designed for cloud specific services. Details regarding these layers are not germane to the inventive embodiments. The storage systems described above can be a part of the server layer for providing storage services.

Thus, a method and apparatus for providing storage system information have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for providing information regarding a storage device to a computing system, comprising:

generating a plurality of searchable data structures for storing a plurality of data object types at a temporary memory storage device of a management console, where each data object type stores information regarding the storage device;

maintaining a lock data structure to prevent access to at least one of the searchable data structures, where the lock data structure stores a plurality of locks, each lock associated with a storage server interfacing with the management console;

receiving a request from the computing system to access information regarding the storage device managed by a storage server, where the request is received by a processor executable management application executed by the management console and the request includes identification information of the storage server;

deriving a key using the identification information the storage server;

using the derived key to obtain requested information from the searchable data structure; and placing a lock for the searchable data structure storing the requested information to prevent access while the information is being provided to the computing system.

2. The method of claim 1, wherein the plurality of data object types includes a unique identifier for each of a plurality of logical unit numbers (LUNs) that are presented to the computing system for storing information at the storage device.

3. The method of claim 2, wherein the unique identifier is derived using the identification information for the storage server and an identifier for each LUN.

4. The method of claim 1, wherein the plurality of data object types include a unique identifier for each of a plurality of storage volumes presented to the computing system by the storage server.

5. The method of claim 4, wherein the unique identifier is derived using the identification information for the storage server and an identifier for each storage volume.

6. The method of claim 1, wherein the plurality of data object types includes a unique identifier identifying the storage device and derived by using the identification information for the storage server.

7. A machine implemented method for providing information regarding a storage device from among a plurality of storage devices to a computing system, comprising:

receiving a request at a management console from the computing system to access information regarding the storage device managed by a storage server from among a plurality of storage servers interfacing with the management console, where the request includes identification information of the storage server;

generating a search key based on the identification information of the storage server and a data object identifier for one of data object types from among a plurality of data object types, where each data object type stores information regarding the plurality of storage devices;

using the search key to obtain requested information from a searchable data structure maintained by the management console at a temporary memory cache and used for storing the plurality of data object types; and placing a lock for a portion of the searchable data structure storing the requested information to prevent access to the portion of the searchable data structure while the information is being provided to the computing system.

8. The method of claim 7, wherein the plurality of data object types include a unique identifier for each of a plurality of logical unit numbers (LUNs) that are presented to the computing system for storing information at the storage device.

9. The method of claim 8, wherein the unique identifier is derived using the identification information for the storage server and an identifier for each LUN.

10. The method of claim 7, wherein the plurality of data object types includes a unique identifier for each of a plurality of storage volumes presented to the computing system by the storage server.

11. The method of claim 10, wherein the unique identifier is derived using the identification information for the storage server and an identifier for each storage volume.

12. The method of claim 7, wherein the plurality of data object types include a unique identifier identifying the storage device and derived by using the identification information for the storage server.

13. The method of claim 7, wherein the plurality of storage servers are in a clustered storage environment.

14. The method of claim 7, wherein the plurality of storage servers are in a non-clustered storage environment.

15. The method of claim 7, wherein a processor executable management application at the management console maintains a lock data structure for storing the lock assigned to the data structure that stores the requested information.

16. The method of claim 7, wherein a processor executable management application at the management console maintains the searchable data structure.

17. A system, comprising;

a plurality of client computing systems interfacing with a management console for receiving information related to a plurality of storage devices managed by a plurality of storage servers interfacing with the management console;

wherein the management console is configured to generate a plurality of searchable data structures for storing a plurality of data object types, where each data object type stores information regarding the plurality of storage devices; and maintains a lock data structure to prevent access to at least one of the searchable data structures, where the lock data structure stores a plurality of locks, each lock associated with one of the storage servers interfacing with the management console; and a processor executable key generator for generating a search key based on identification information of one of the plurality of storage servers and a unique identifier identifying a data object type;

wherein the management console uses the key to obtain any requested information from one of the searchable data structures and uses a lock to prevent access to the one of the searchable data structures while a request providing the requested information is being processed.

18. The system of claim 17, wherein the plurality of data object types include a unique identifier for each of a plurality of logical unit numbers (LUNs) that are presented to the computing system for storing information at the storage device.

19. The system of claim 17, wherein the plurality of data object types includes a unique identifier for each of a plurality of storage volumes presented to the computing system.

20. The system of claim 17, wherein the plurality of storage servers are in a clustered storage environment and in a non-clustered storage environment.

* * * * *